United States Patent
Moore et al.

(10) Patent No.: US 9,984,707 B2
(45) Date of Patent: May 29, 2018

(54) WRITE POLE WRAP-AROUND SHIELD WITH GAP LAMINATION

(71) Applicant: Seagate Technology LLC, Cupertino, CA (US)

(72) Inventors: Angela Moore, Redcastle (IE); Aji Baby, Londonderry (GB); Swaraj Basu, Londonderry (GB); Marcus B. Mooney, Quigley's Point (IE)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/349,459

(22) Filed: Nov. 11, 2016

(65) Prior Publication Data
US 2017/0133042 A1 May 11, 2017

Related U.S. Application Data

(60) Provisional application No. 62/254,038, filed on Nov. 11, 2015.

(51) Int. Cl.
| | |
|---|---|
| *G11B 5/31* | (2006.01) |
| *G11B 5/115* | (2006.01) |
| *G11B 5/127* | (2006.01) |
| *G11B 5/23* | (2006.01) |
| *G11B 5/235* | (2006.01) |

(52) U.S. Cl.
CPC ............ *G11B 5/115* (2013.01); *G11B 5/1278* (2013.01); *G11B 5/232* (2013.01); *G11B 5/235* (2013.01); *G11B 5/315* (2013.01); *G11B 5/3116* (2013.01); *G11B 5/3163* (2013.01)

(58) Field of Classification Search
None
See application file for complete search history.

(56) References Cited

U.S. PATENT DOCUMENTS

| | | | | |
|---|---|---|---|---|
| 7,551,394 B2 * | 6/2009 | Sasaki | ................ | G11B 5/1278 360/125.07 |
| 7,562,437 B2 | 7/2009 | Pentek et al. | | |
| 7,649,712 B2 | 1/2010 | Le et al. | | |
| 7,715,147 B2 | 5/2010 | Feldbaum et al. | | |
| 7,848,054 B2 | 12/2010 | Hsiao et al. | | |
| 7,978,431 B2 * | 7/2011 | Han | ...................... | G11B 5/3116 29/603.07 |
| 8,051,552 B2 | 11/2011 | Jiang et al. | | |
| 8,120,874 B2 | 2/2012 | Hsiao et al. | | |
| 8,238,059 B1 * | 8/2012 | Tang | .................... | G11B 5/1278 360/125.03 |
| 8,322,023 B1 | 12/2012 | Zeng et al. | | |
| 8,409,453 B1 | 4/2013 | Jiang et al. | | |
| 8,454,846 B1 | 6/2013 | Zhou et al. | | |
| 8,780,498 B1 * | 7/2014 | Jiang | .................... | G11B 5/1278 360/125.03 |
| 8,830,626 B2 | 9/2014 | Helm et al. | | |
| 8,842,390 B2 | 9/2014 | Shen et al. | | |

(Continued)

*Primary Examiner* — William J Kilmowicz
(74) *Attorney, Agent, or Firm* — Hall Estill Attorneys at Law

(57) ABSTRACT

A data writer can have at least a write pole laterally disposed between first and second side shields and vertically disposed between a wrap-around shield and a front shield. The write pole may be separated from the side shields and the wrap-around shield by a lamination of first and second non-magnetic layers.

20 Claims, 5 Drawing Sheets

(56) References Cited

U.S. PATENT DOCUMENTS

| | | | |
|---|---|---|---|
| 8,995,087 B1 | 3/2015 | Chen et al. | |
| 9,196,267 B2* | 11/2015 | Basu | G11B 5/11 |
| 9,361,912 B1* | 6/2016 | Liu | G11B 5/187 |
| 9,406,317 B1* | 8/2016 | Tang | G11B 5/3116 |
| 9,508,364 B1* | 11/2016 | Tang | G11B 5/112 |
| 9,589,582 B2* | 3/2017 | Liu | G11B 5/187 |
| 9,626,990 B2* | 4/2017 | Tang | G11B 5/112 |
| 2003/0043512 A1* | 3/2003 | Ejiri | G11B 5/00 360/313 |
| 2005/0034789 A1* | 2/2005 | Yazawa | G11B 5/1276 148/312 |
| 2005/0175866 A1* | 8/2005 | Ohno | G11B 5/73 428/845.6 |
| 2008/0013209 A1* | 1/2008 | Sasaki | G11B 5/1278 360/110 |
| 2008/0297945 A1* | 12/2008 | Han | G11B 5/3116 360/125.3 |
| 2010/0301007 A1* | 12/2010 | Ishizaki | G11B 5/1278 216/22 |
| 2012/0140356 A1* | 6/2012 | Horide | G11B 5/3116 360/75 |
| 2015/0085402 A1* | 3/2015 | Bashir | G11B 5/3116 360/235.4 |
| 2015/0199982 A1* | 7/2015 | Mooney | G11B 5/1278 427/131 |
| 2016/0307586 A1* | 10/2016 | Liu | G11B 5/187 |
| 2017/0076742 A1* | 3/2017 | Tang | G11B 5/112 |
| 2017/0092300 A1* | 3/2017 | Lu | G11B 5/115 |

* cited by examiner

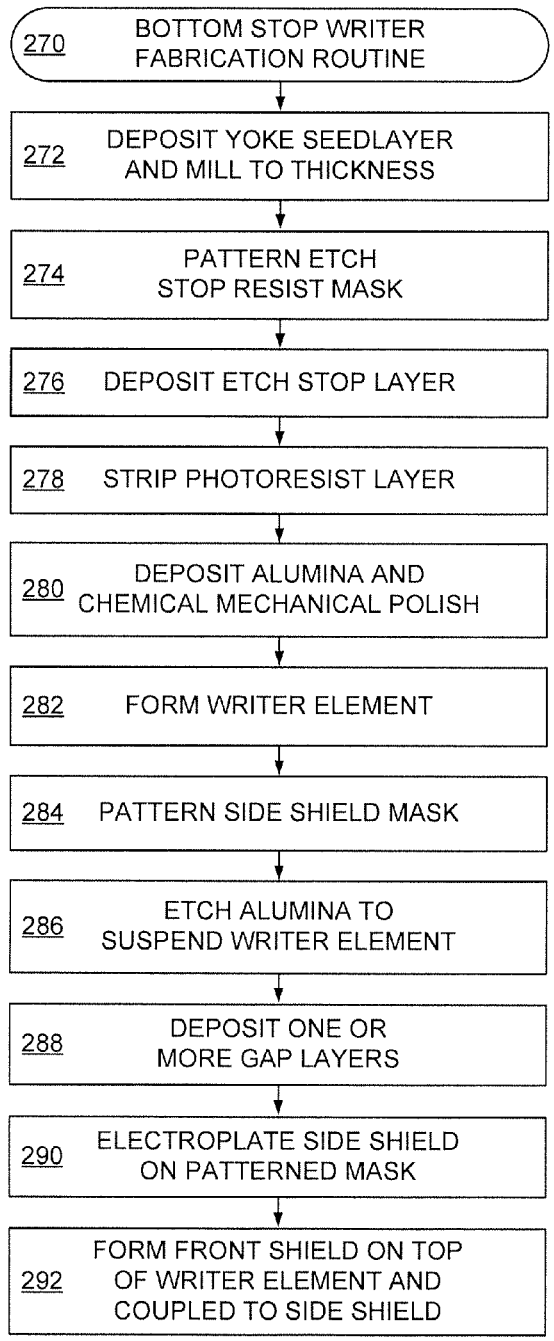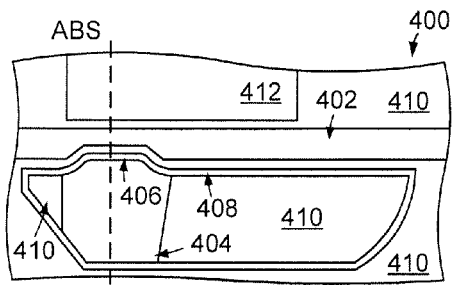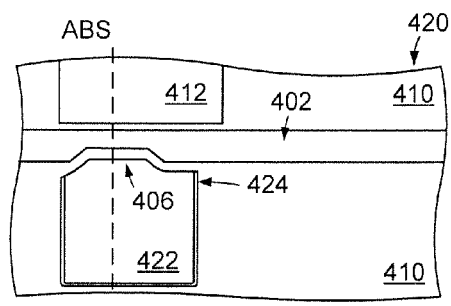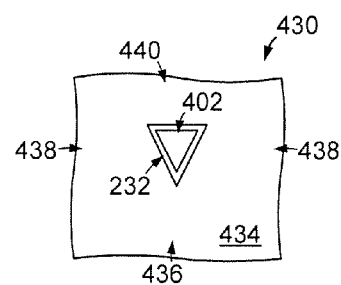
FIG. 6A
FIG. 6B

WRITE POLE WRAP-AROUND SHIELD WITH GAP LAMINATION

RELATED APPLICATION

The present application makes a claim of domestic priority to U.S. Provisional Patent Application No. 62/254,038 filed Nov. 11, 2015, the contents of which are hereby incorporated by reference.

SUMMARY

A data writer, in accordance with various embodiments, has a write pole laterally disposed between first and second side shields and vertically disposed between a wrap-around shield and a front shield. The write pole is separated from the side shields and the wrap-around shield by a lamination of first and second non-magnetic layers.

BRIEF DESCRIPTION OF THE DRAWINGS

FIGS. 6A and 6B respectively provide a flowchart and representative illustrations of an example bottom stop writer fabrication routine that can be executed to produce the example data writers of FIGS. 3A and 3B.

DETAILED DESCRIPTION

As data storage components, like a data writer or data reader, scale down to accommodate increased data densities that provide greater data capacities, the magnetic volatility of the data storage component increases as magnetic materials are brought in closer proximity. Such close proximity increases the risk of inadvertent shunting and magnetic saturation that jeopardize the magnetic strength and stability of a data storage component. Hence, there is a continued interest in mitigating magnetic shunting and increasing magnetic stability in data storage components with reduced physical dimensions and close proximity of magnetic shield materials.

Accordingly, a data writer can be configured with a write pole laterally disposed between first and second side shields and vertically disposed between a wrap-around shield and a front shield with the write pole separated from the side shields and the wrap-around shield by a lamination of first and second non-magnetic layers. The lamination of non-magnetic layers can be tuned to have varying magnetic flux densities to promote magnetic stability and reduce the risk of unwanted magnetic shunting. The combination of the non-magnetic lamination with the wrap-around shield that positions a magnetic shield proximal a leading tip of the write pole provides a balance of precise magnetic shielding without degrading the data writing performance of the data writer.

Figure 1:
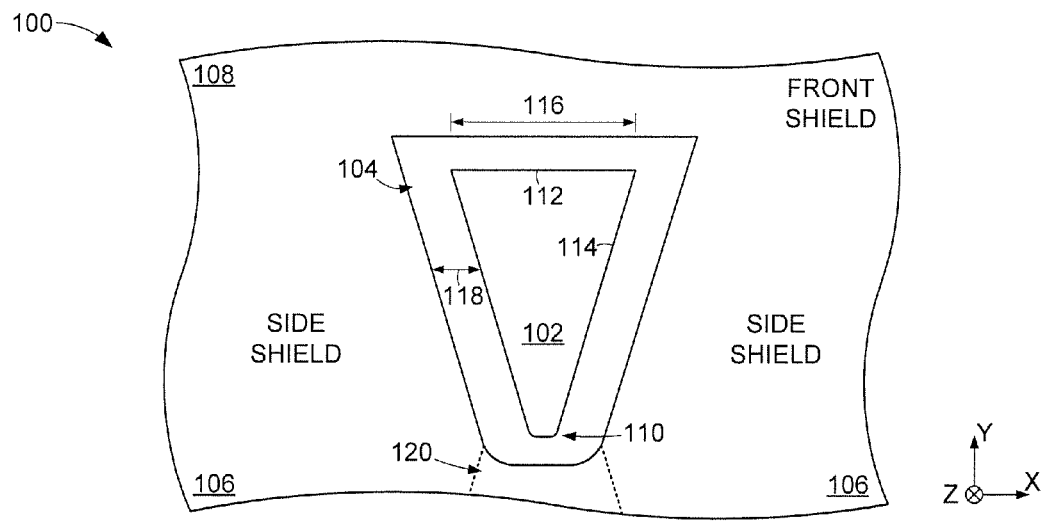
FIG. 1 is an air bearing view line representation of a portion of an example data writer constructed in accordance with various embodiments.

FIG. 1 is an air bearing view line representation of a portion of an example data writer 100 arranged in accordance with various embodiments. The data writer 100 may be incorporated into a transducing head that consists of other data storage components, such as a magnetoresistive data reader, that operate to sense data bits stored on a rotating data storage medium. The data writer 100 has a write pole 102 surrounded by a non-magnetic gap material 104 that separates the magnetic material of the write pole 102 from the soft magnetic material of side 106 and front 108 shields.

Although not required or limiting, the write pole 102 is shaped as a trapezoid that provides an uptrack leading tip 110 and a downtrack trailing edge 112 connected by tapered sidewalls 114. As data density in data storage devices increases, the angle of the respective sidewalls 114 has increased to make the trailing edge 112 longer and the leading tip 110 more severe. Such increased lateral write pole 102 width 116 at the trailing edge 112 can correspond with unwanted data erasure conditions as magnetic flux is directed away from a data bit along downtrack (Y axis) and/or cross-track (X-axis) directions to produce on-track erasure, off-track erasure, and adjacent track interference (ATI). It is contemplated that the increased write pole width 116 heightens the chances for inadvertent shunting with an adjacent magnetic shield, which can transport magnetic flux across several different data tracks.

A reduction in the amount of magnetic shielding material proximal the leading tip 110 of the write pole 102 has conventionally been a mechanism for reducing magnetic shield saturation and risk of erasure conditions. However, the decrease in the size 118 of the gap material, such as 100 nm or less, has rendered the uptrack non-magnetic material, as illustrated by segmented lines 120, less effective. Thus, various embodiments configure the side shields 106 to continuously extend around the leading tip 110 to opposite lateral sides of the write pole 102 to provide a wrap-around shield, which can also be characterized as a box shield.

While the utilization of a wrap-around shield to position shielding material proximal the leading tip 110 of the write pole 102 can mitigate unwanted shunting to the shields, the magnetic performance of the write pole 102 may be hampered as magnetic field and magnetic field gradient decrease in response to the wrap-around shield and smaller gap size 118. Accordingly, the non-magnetic gap material 104 can be arranged as a lamination of multiple different material configurations that optimize the magnetic characteristics of the write pole 102 despite the presence of the wrap-around shield and a 100 nm or less gap size 118.

Figure 2:
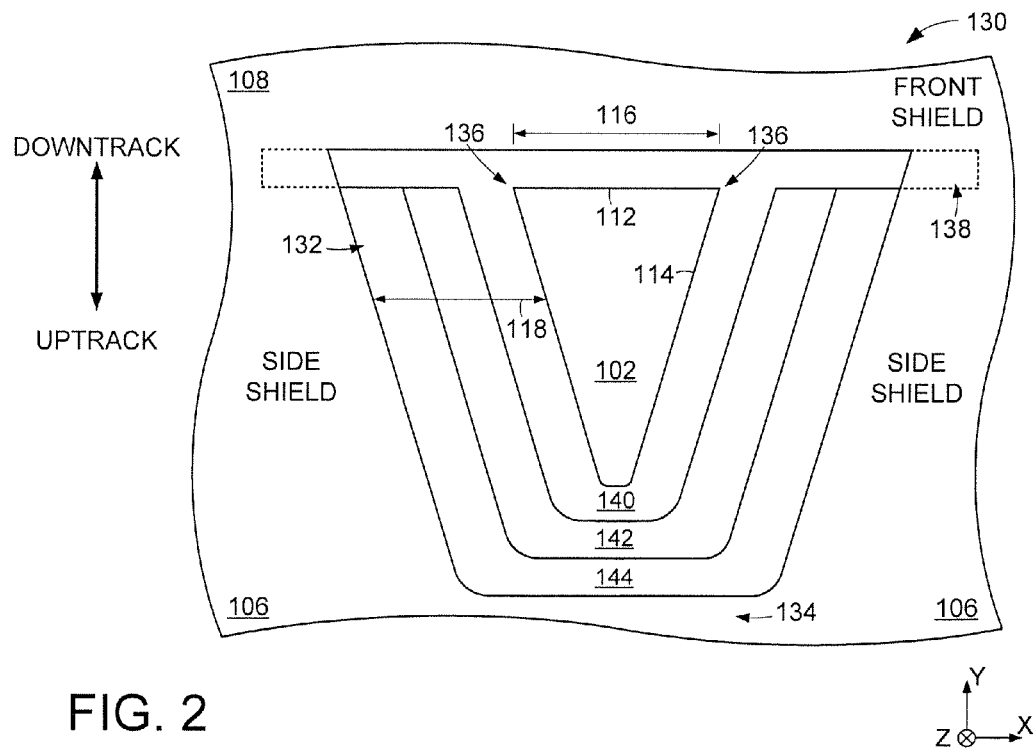
FIG. 2 shows a line representation of a portion of an example data writer fabrication system configured in accordance with some embodiments.

FIG. 2 illustrates an air bearing view a line representation of a portion of an example data writer 130 configured with a non-magnetic gap lamination 132 in accordance with some embodiments. The non-magnetic gap lamination 132 separates the write pole 102 from side 106 and wrap-around 134 shields with multiple layers continuously extending from a first corner 136 of the trailing edge 112 of the write pole 102 to an opposite second corner 136 around the leading tip 110. The gap lamination 132, in some embodiments, extends into the side shields 106 with an overhanging letterbox region 138, as shown in data writer 130 with segmented lines.

Although any number of layers of similar or dissimilar materials can be incorporated into the non-magnetic gap lamination 132, the embodiment shown in FIG. 2 shows first 140, second 142, and third 144 layers each having different configurations to optimize the performance of the data writer 130. The first gap lamination layer 140 completely surrounds the write pole 102 and separates the trailing edge 112 from the front shield 108 while the second gap lamination layer 142 is positioned to extend no farther uptrack than the trailing edge 112 of the write pole 102. That is, the second gap lamination layer 142 extends uptrack from a plane parallel to the trailing edge 112 along the X axis on the air bearing surface. The third gap lamination layer 144 continuously extends uptrack and downtrack from the trailing edge 112 of the write pole 102 to provide multiple different materials between the respective pole corners 136 and the respective shields 106 and 108.

While descending embodiments are contemplated, the gap lamination 132 is configured in some embodiments with materials having ascending magnetic flux densities moving away from the write pole 102. As a non-limiting example, the first gap lamination material 140 can have a lower magnetic flux density than the second 142 and third 144 layers, the second 142 layer has a lower magnetic flux density than the third layer 144, and the third layer 144 has a lower magnetic flux density than the side 106 and wrap-around 134 shields. Some embodiments arrange the first gap lamination layer 140 as a dielectric material with approximately zero magnetic flux density while the second gap lamination layer 142 has a 0.5 T flux density and the third gap lamination layer 144 has a 1 T flux density, which are each less than the approximately 1.6 T flux density of the side 108 and wrap-around 134 shields.

The ability to tune the materials, shapes, and sizes of the various gap lamination 132 layers allows the magnetic field and field gradient of the write pole 102 to increase. The combination of multiple different flux density materials further mitigates the risk of magnetic shield saturation that leads to erasure and data interference conditions. However, decreasing the size 118 of the non-magnetic gap can still be prone to inadvertent shunting and saturation of the front shield 108 proximal the trailing edge 112 of the write pole 102. Thus, various embodiments arrange the gap lamination 132 to provide greater amounts of non-magnetic material between the front shield 108 and the write pole 102.

Figure 3A:
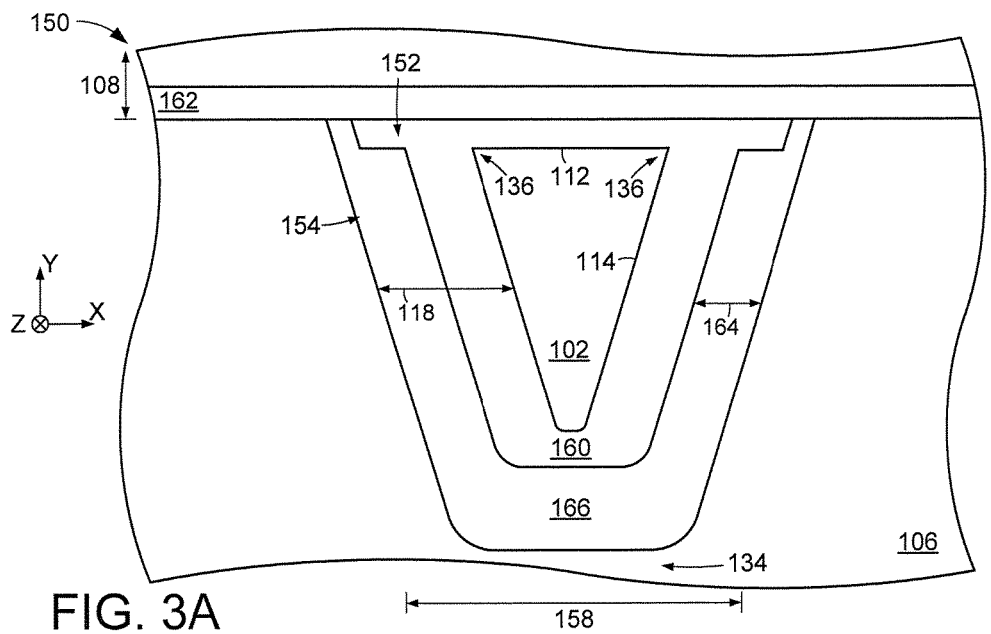
FIGS. 3A and 3B respectively display line representations of portions of an example data writer arranged in accordance with assorted embodiments.
Figure 3B:
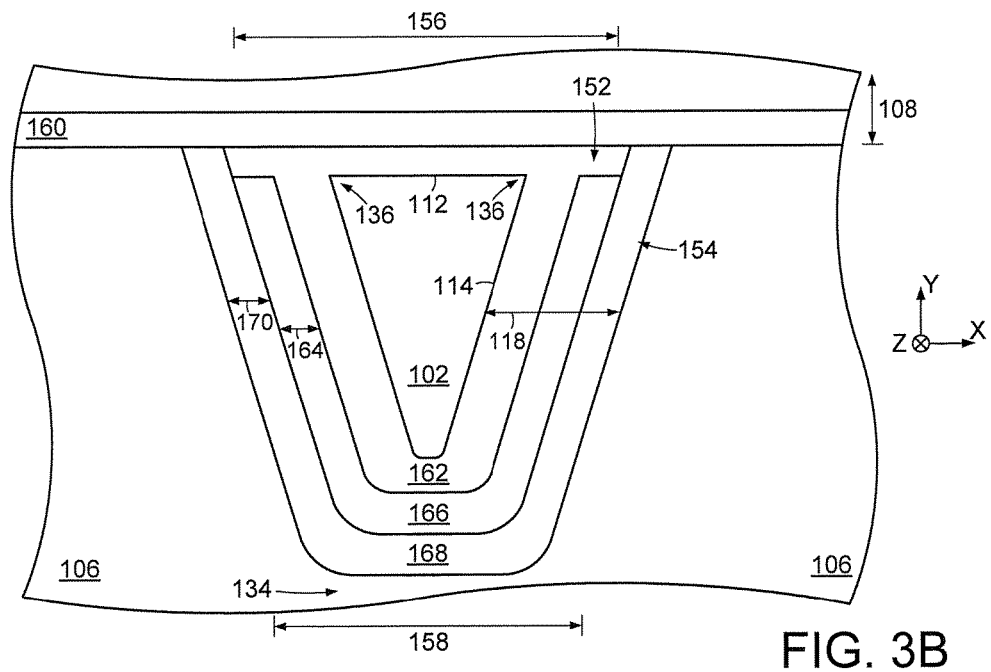

FIGS. 3A and 3B respectively display air bearing view line representations of portions of an example data writer 150 configured in accordance with assorted embodiments to provide a letterbox notch 152 downtrack and proximal to the trailing edge 112 of the write pole 102. The letterbox notch 152 can be characterized as a portion of the gap lamination 154 that has a greater downtrack width 156 than the trailing edge width 158 of a first gap lamination layer 160 as measured laterally adjacent the write pole corners 136, parallel to the X axis on the ABS.

The letterbox notch 152 can be formed as part of the side shields 106, as shown, and/or as part of the front shield 108. The position and width 156 of the letterbox notch 152 can act in concert with one or more front shield seed layers 162 to reduce the risk of front shield 108 magnetic saturation and/or loss of write pole field strength or gradient through shunting. In FIG. 3A, the letterbox notch 152 is filled with the first gap lamination layer 160 that surrounds the write pole 102 and is formed via a varying thickness 164 in a second gap lamination layer 166 where the thickness 164 is measured parallel to the X axis on the ABS. It is contemplated that the first 160 and second 166 gap layers can be constructed with a varying thickness on the ABS or with a uniform thickness of 20-40 nm. The varying or uniform thickness of the various gap lamination layers can define the letterbox notch 152, for instance, by aligning the edge of the first gap lamination layer 160 with the trailing edge 112 of the write pole 102, as generally illustrated in FIG. 3B.

Also in FIG. 3B, the lateral sidewalls of the letterbox notch 152 are defined by a third gap lamination material 168 that contacts the front shield seed layer 162 in multiple places by continuously extending from proximal the first write pole corner 136 around the leading tip 110 to a second point proximal the second write pole corner 136. By tuning the thickness 170 and material of the third gap lamination layer 168 relative to the second gap lamination layer 166, the magnetic characteristics and data writing performance of the data writer 150 can be controlled. For instance, configuring the third gap lamination layer 168 with a smaller uniform thickness 170 and greater magnetic flux density than the first 160 and second 166 gap lamination layers can provide an optimized balance between magnetic shielding of stray magnetic fields with high flux density materials and write pole 102 performance corresponding to high write field and field gradients.

Figure 4:
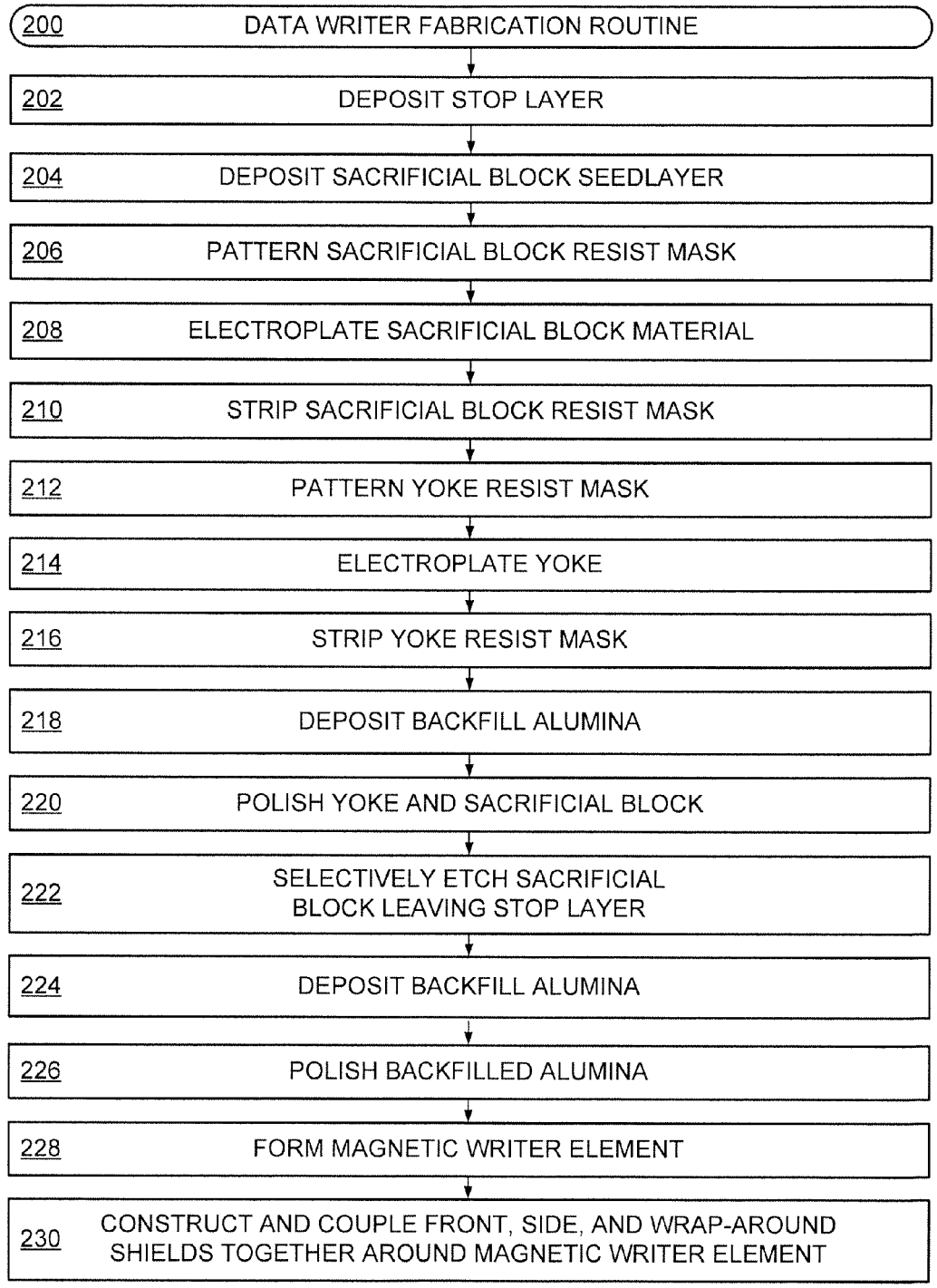
FIG. 4 depicts a flowchart and representative illustrations of an example data writer fabrication routine carried out in accordance with some embodiments.

Although it is noted that a diverse variety of lithographic techniques can construct a data writer, FIG. 4 is an example data writer fabrication routine 200 conducted in accordance with various embodiments to provide a wrap-around shield and optimized data writer performance. It is initially noted that the steps of routine 200 can be conducted at any time before, during, and after the construction of other aspects of a transducing head. For instance, routine 200 can be carried out before a data writer yoke is formed, after a data reader is constructed, and/or before the data writer is implemented into a transducing head.

The routine 200 begins by depositing a stop layer in step 202, such as a polish or etch stop material, on a patterned etch stop resist mask layer. A sacrificial block seedlayer is then deposited in step 204 atop the stop layer before step 206 patterns a sacrificial block resist mask. With the block resist mask patterned, step 208 proceeds to electroplate a sacrificial block. The sacrificial block resist mask is stripped in step 210 prior to a writer element resist mask being patterned into a writer element shape that is subsequently used in step 212 to electroplate a magnetic writer element, such as a yoke. Step 216 then strips the writer element resist mask to reveal the writer element.

Next, alumina, or other non-magnetic material, is backfilled in step 218 around the writer element and sacrificial block. The formed lamination is then planarized by polishing, such as with chemical mechanical polishing, at least the writer element and sacrificial block in step 220. The sacrificial block material is selectively etched in step 222, which reveals the stop layer deposited in step 202. The removal of the sacrificial block material allows step 224 to backfill alumina, or some other non-magnetic material, atop the writer element and stop layer. The backfilled alumina material is planarized with a polish operation of step 226. The planar alumina surface then provides a substrate for a magnetic writer element, such as a write pole, to be formed in step 228 at a position that is to be the air bearing surface.

The formation of the magnetic writer element advances to step 230 where shields, such as continuous side shields that incorporate a wrap-around portion and a front shield, are constructed to contact and be coupled together. The use of the sacrificial block as a lateral stop in routine 200 controls the placement of the back of a wrap-around shield, distal the ABS. Back-edge placement is contingent on the position and slope of the non-magnetic alumina below the magnetic writer element and the lateral stop facilitates straightening the back-edge of the wrap-around shield away from the ABS.

Figure 5A:
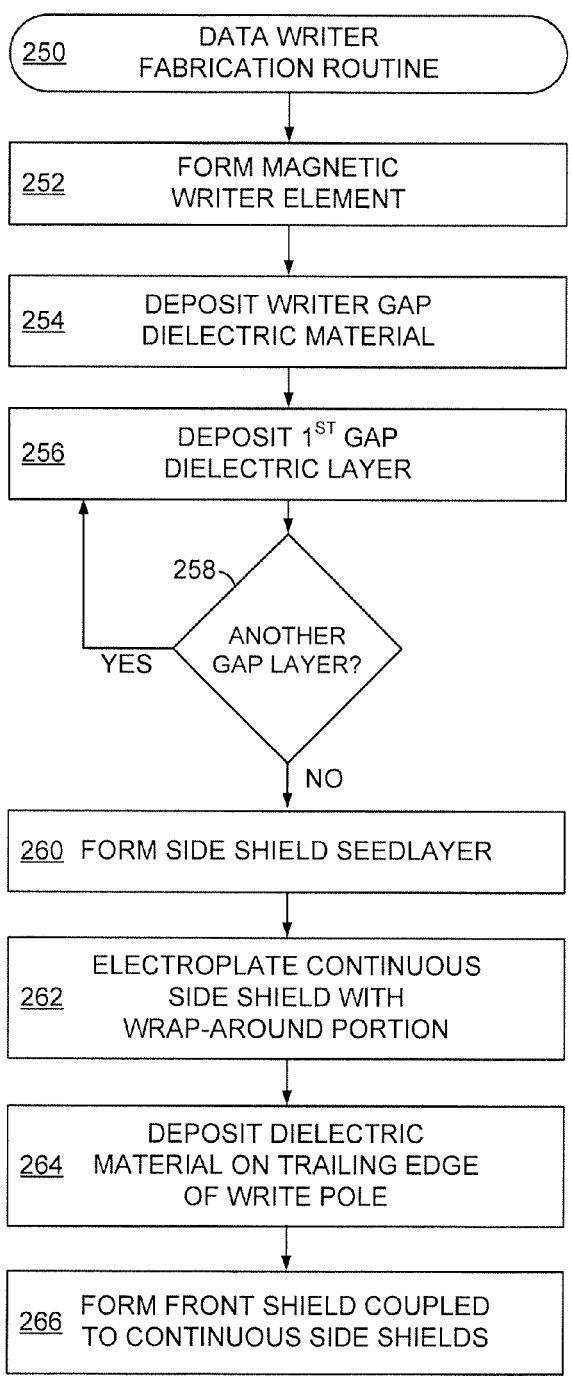
FIGS. 5A and 5B respectively provide a flowchart and representative illustrations of an example data writer fabrication routine that may be conducted in accordance with various embodiments.
Figure 5B:
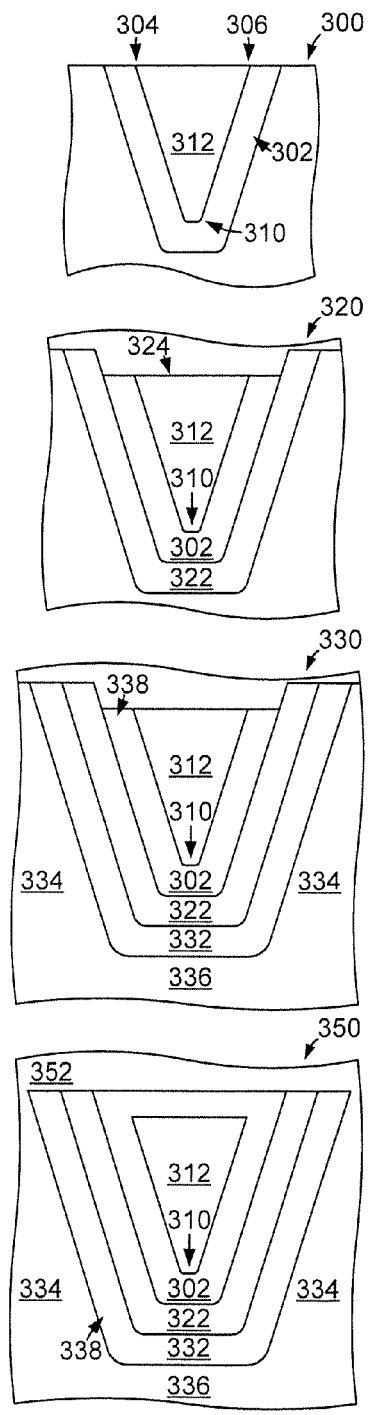

FIGS. 5A and 5B respectively convey an example data writer fabrication routine 250 along with representative illustrations. It is contemplated, but not required, that at least one seed layer is formed on a substrate before step 252 forms a magnetic writer element, such as a write pole. Step 252 may involve one or more etch stop and/or photoresist mask layers that define the size and shape of the magnetic writer element. In some embodiments, step 254 deposits a first writer gap dielectric layer after continuous side shields with a wrap-around portion is patterned and the magnetic writer element is suspended by etching alumina around the writer element. In example data writer 300, a first gap dielectric layer 302 may have a magnetic flux density of less than 0.5 T and continuously extend from a first write pole corner 304 to a second write pole corner 306 around the leading tip 310 of the write pole 312, as illustrated.

With the first gap dielectric layer contacting the magnetic writer element, step 256 proceeds to deposit a second gap dielectric layer with a greater magnetic flux density than the first gap dielectric layer, such as 0.5-1 T. Data writer 320 shows how the second gap dielectric layer 322 can be separated from the write pole 312 by the first gap dielectric layer 302 and can extend no farther downtrack than the trailing edge 324 of the write pole 312. It is noted that the second gap dielectric layer may be configured with a uniform or varying thickness that provides portions of a letterbox region downtrack from the write pole.

Decision 258 evaluates and determines if any additional dielectric layers are to be incorporated into the gap lamination portion of the data writer. If the gap lamination is to have more dielectric layers with a lower magnetic flux density than the adjacent magnetic shields, step 256 is revisited to form more dielectric gap layers. The example data writer 330 illustrates how a third gap dielectric layer 332 can continuously extend from a plane downtrack of the trailing edge of the write pole 312 and proximal the first corner 304 around the leading tip 310 to the second corner 306. It is noted that the third gap dielectric layer can have a magnetic flux density that is greater than each of the first 302 and second 322 layers, but less than the side shields, such as approximately 1 T.

Once decision 258 determines no more dielectric layers are to be incorporated into the gap lamination, routine 250 advances to step 260 where at least one side shield seed layer is formed with material that promotes the electroplating formation of continuous side shields in step 262. Example data writer 330 illustrates how the continuous side shield 334 extends around the leading tip 310 and provides a wrap-around shield portion 336 that is separated from the write pole 312 by the respective dielectric layers of the gap lamination 338. The formation of the side and wrap-around shields progresses routine 250 to step 264 where the first gap dielectric material is deposited atop the trailing edge of the magnetic writer element to completely surround the writer element with a continuous layer of dielectric material.

The first gap dielectric layer contacting the trailing edge provides a surface on which a front shield is formed in step 266. The formation of the front shield with step 266 can consist of depositing one or more shield seed layers. Regardless of the use of a front shield seed layer, the front shield is magnetically coupled to the continuous side shields so that the collective data writer shields provide a magnetic loop around the magnetic writer element, which can increase shield stability and decrease the risk of unwanted erasure conditions occurring. Example data writer 350 represents an air bearing view of a write pole 312 portion of a transducing head configured with a front shield 352 coupled to sBide 334 and wrap-around 336 shields In FIGS. 6A and 6B, an example bottom stop writer fabrication routine 270 is displayed along with exemplary illustrations. In comparison to the fabrication routine 250 of FIG. 5A a leading shield is not created first and instead the writer element (write pole) is suspended to facilitate electroplating a continuous side shield that surrounds the writer element. Step 272 initially deposits a yoke seedlayer and mills the seedlayer to a predetermined thickness. A stop resist mask layer is then deposited and patterned in step 274 prior to an etch stop layer being deposited in step 276.

A photoresist layer is stripped in step 278 then alumina and chemical mechanical polish is deposited 280. A writer element, such as a write pole is formed in step 282. A side shield mask that is patterned in step 284 allows step 286 to etch alumina in order to suspend the writer element. One or more gap layers are then deposited in step 288 around the writer element. It is noted that step 288 may create multiple magnetic, or non-magnetic, gap layers that may have different shapes, configurations, and thicknesses, such as the gap laminations shown in FIGS. 3A and 3B.

Next, step 290 electroplates side shields on the previously patterned mask to completely surround the writer element. That is, a single side shield is formed in step 290 that surrounds the writer element by being positioned on opposite lateral sides, as well as on opposite leading and front sides, of the writer element. While not required, a front shield can be subsequently formed atop the writer element in step 292. The front shield can be coupled to the side shield via direct physical contact while being separated from the writer element by one or more gap layers deposited in step 288.

The side view line representation of a portion of an example data writer 400 is shown in FIG. 6B. The writer 400 is conveyed during fabrication and prior to processing the air bearing surface (ABS) that will be positioned along the segmented line. Writer 400 shows how the writer element 402 tapers proximal the ABS where the leading portion 404 of the side shield has an increased thickness 406. The magnetic leading portion 404 is contained within a continuous layer of alumina 408 along with non-magnetic material 410 that serves to magnetically isolate the various aspects of the data writer 400, such as the front shield 412 from the writer element 402. It is noted that the leading portion 404 extends a predetermined distance from the ABS and does not fill the entirety of the region defined by the alumina layer 408.

The side view line representation of the example data writer 420 in FIG. 6B depicts how routine 270 can deposit, pattern, and electroplate a sacrificial block seedlayer prior to step 274 to create a different wrap-around shield configuration. As illustrated, writer 420 has a leading portion 422 of the side/wrap-around shields that is separated from the non-magnetic material 410 on three sides by a continuous alumina layer 424. While the leading portion 422 has an increased thickness 406, like leading portion 404, the leading portion 422 material is separated from the writer element 402 by only the non-magnetic material 410, as opposed to the alumina 408 and non-magnetic material 410 in writer 400.

Regardless of the steps of routine 270 or the configuration of the wrap-around shield (400/420) a continuous magnetic layer will be present on the ABS. Writer 430 displays an air bearing view of the writer element 402 surrounded by a non-magnetic gap layer 432, which may be part of the non-magnetic material 410, and a magnetic wrap-around shield 434. The shield 434 can be characterized as having different, but contiguous portions, such as the leading 436, side 438, and front 440 portions.

It is noted that the various aspects of routines 200 and 250 are not required or limiting and any portion of the respective routines can be changed and removed just as additional aspects can be incorporated. For example, additional steps can be incorporated into routine 250 that shape a letterbox notch out of one or more dielectric layers of the gap lamination. As another example, steps in routine 200 can be changed to form a wrap-around shield layer uptrack from the magnetic writer element that contacts and is coupled to the respective side shields.

Through the various embodiments of the present disclosure, a wrap-around shield is incorporated into a data writer to encapsulate the write pole at the ABS with shielding material. The ability to control the risk of magnetic shield saturation with a gap lamination of multiple dielectric layers provides an optimized balance of shielding with high write pole field strength and field gradient. The possible incorporation of a letterbox notch in the gap lamination further provides configurations that can tune the shielding characteristics of a data writer along with the magnetic capabilities of the write pole.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a write pole laterally disposed between first and second side shields and vertically disposed between a wrap-around shield and a front shield, the write pole separated from the side shields and the wrap-around shield by a lamination of first and second dielectric layers, the first dielectric layer having a different magnetic flux density than the second dielectric layer.

2. The apparatus of claim 1, wherein the write pole comprises a leading tip and a trailing edge, the leading tip proximal the wrap-around shield and the trailing edge proximal the front shield.

3. The apparatus of claim 2, wherein the first and second dielectric layers each continuously extend from a first tip of the trailing edge proximal the first side shield around the leading tip to a second tip of the trailing edge proximal the second side shield.

4. The apparatus of claim 1, wherein the first dielectric layer has a smaller magnetic flux density than the second dielectric layer, the first dielectric layer positioned between the write pole and the second dielectric layer.

5. The apparatus of claim 1, wherein the first and second dielectric layers have different thicknesses.

6. The apparatus of claim 1, wherein the write pole has a trapezoidal shape on an air bearing surface (ABS).

7. The apparatus of claim 1, wherein the wrap-around shield seamlessly extends from the respective side shields on an air bearing surface (ABS).

8. An apparatus comprising a write pole laterally disposed between first and second side shields and vertically disposed between a wrap-around shield and a front shield, the write pole separated from the front shield by a first dielectric layer and separated from each side and wrap-around shield by a lamination of the first dielectric layer, a second dielectric layer, and a third dielectric layer, the second dielectric layer having a greater magnetic flux density than the first dielectric layer and a smaller magnetic flux density than the third dielectric layer.

9. The apparatus of claim 8, wherein a letterbox notch is positioned between a trailing edge of the write pole and the front shield, the letterbox notch filled with the first dielectric layer.

10. The apparatus of claim 8, wherein the write pole is separated from the front shield by a smaller distance than from the first side, second side, or wrap-around shields.

11. The apparatus of claim 8, wherein the second dielectric layer contacts and is disposed between the first dielectric layer and the third dielectric layer.

12. The apparatus of claim 11, wherein each dielectric layer has a greater than zero magnetic flux density.

13. The apparatus of claim 8, wherein the side shields, front shield, and wrap-around shield are coupled together.

14. A method comprising:
forming a wrap-around shield;
depositing first and second side shields atop the wrap-around shield to define a write pole trench;
forming a lamination of a first and second dielectric layers in the write pole trench, the first dielectric layer having a different magnetic flux density than the second dielectric layer; and
depositing a write pole in the write pole trench, the write pole separated from each side shield and the wrap-around shield by the first and second dielectric layers.

15. The method of claim 14, wherein an etch stop layer is positioned on the wrap-around shield.

16. The method of claim 14, wherein each side shield is electroplated.

17. The method of claim 14, wherein the wrap-around shield comprises a leading shield layer contacting the first and second side shields.

18. The method of claim 17, wherein the leading shield layer is a different material than the first and second side shields.

19. The method of claim 14, wherein the wrap-around shield and a front shield are respectively formed atop first and second seed layers.

20. The method of claim 14, wherein the first dielectric layer extends no farther downtrack than a trailing edge of the write pole, the second dielectric layer extending farther downtrack than the trailing edge.

* * * * *